United States Patent
Bellise et al.

(10) Patent No.: US 11,313,579 B1
(45) Date of Patent: Apr. 26, 2022

(54) HANGER FOR SUPPORTING AN AIR HANDLER

(71) Applicant: Duro Dyne Corporation, Bay Shore, NY (US)

(72) Inventors: Andrew J. Bellise, South Farmingdale, NY (US); David B. Krupnick, Mattituck, NY (US); William Vazquez, East Islip, NY (US)

(73) Assignee: Duro Dyne Corporation, Bay Shore, NY (US)

( * ) Notice: Subject to any disclaimer, the term of this patent is extended or adjusted under 35 U.S.C. 154(b) by 17 days.

(21) Appl. No.: 16/950,195

(22) Filed: Nov. 17, 2020

(51) Int. Cl.
| | |
|---|---|
| *F24F 13/02* | (2006.01) |
| *F16M 1/00* | (2006.01) |
| *F24F 13/32* | (2006.01) |

(52) U.S. Cl.
CPC ........... *F24F 13/0254* (2013.01); *F16M 1/00* (2013.01); *F24F 13/32* (2013.01)

(58) Field of Classification Search
CPC ........ F16M 1/00; F24F 13/0254; F24F 13/32; H02G 3/263
See application file for complete search history.

(56) References Cited

U.S. PATENT DOCUMENTS

| | | | | |
|---|---|---|---|---|
| 2,164,299 | A * | 6/1939 | Mandell | A47G 1/08 |
| | | | | 122/1 R |
| 4,620,683 | A * | 11/1986 | Claydon | B65B 67/1227 |
| | | | | 248/431 |
| 5,372,341 | A * | 12/1994 | Witherbee | H02G 3/263 |
| | | | | 411/84 |
| 6,637,608 | B1 * | 10/2003 | Schneider | A47F 5/13 |
| | | | | 211/195 |
| 6,789,688 | B2 * | 9/2004 | Roush | A47F 5/0018 |
| | | | | 211/90.02 |
| D653,064 | S | 1/2012 | Lutt | |
| 8,935,929 | B1 | 1/2015 | Prater | |
| D756,145 | S | 5/2016 | Davis | |
| D757,456 | S | 5/2016 | Sheppard | |
| D779,147 | S | 2/2017 | Bauernfeind et al. | |
| D781,063 | S | 3/2017 | Shah et al. | |
| 9,629,455 | B2 | 4/2017 | Shah et al. | |
| D834,853 | S | 12/2018 | Lin | |
| D834,854 | S | 12/2018 | Lin | |
| D869,873 | S | 12/2019 | Ash | |
| 2011/0309042 | A1 * | 12/2011 | Finck | B65G 49/062 |
| | | | | 294/137 |
| 2014/0054425 | A1 * | 2/2014 | Jang | F16L 3/221 |
| | | | | 248/49 |
| 2015/0069191 | A1 * | 3/2015 | Filseth | B60N 2/2854 |
| | | | | 248/164 |

(Continued)

FOREIGN PATENT DOCUMENTS

| | | | | |
|---|---|---|---|---|
| CN | 110207348 A | * | 9/2019 | .......... F24F 13/0254 |
| DE | 9113564 U1 | * | 2/1992 | |
| DE | 19532681 A1 | * | 3/1997 | ................ F16L 3/00 |

(Continued)

*Primary Examiner* — Eret C McNichols
(74) *Attorney, Agent, or Firm* — Carter, DeLuca & Farrell LLP; George Likourezos; Bradley J. Shelowitz

(57) ABSTRACT

A hanger for suspending an air handler includes first and second elongate struts. The first strut defines a channel transversely therethrough configured for receipt of the second strut. A fastener assembly selectively fixes the second strut to the first strut.

20 Claims, 4 Drawing Sheets

(56) References Cited

U.S. PATENT DOCUMENTS

2015/0090846 A1 * 4/2015 Crowley .................. F24F 13/32
                                                        248/676

FOREIGN PATENT DOCUMENTS

| EP | 3107165 A1 | * | 12/2016 | ........... H02G 3/0437 |
|----|------------|---|---------|-------------------------|
| EP | 3567686 A1 | * | 11/2019 | |
| FR | 2663086 A | * | 12/1991 | ........... E04B 1/1903 |
| GB | 2447429 A | * | 9/2008 | ........... H02G 3/0443 |
| JP | 09210253 A | * | 8/1997 | ................ F16L 3/00 |
| KR | 100619136 B1 | * | 8/2006 | |
| KR | 20080010118 A | * | 1/2008 | |

* cited by examiner

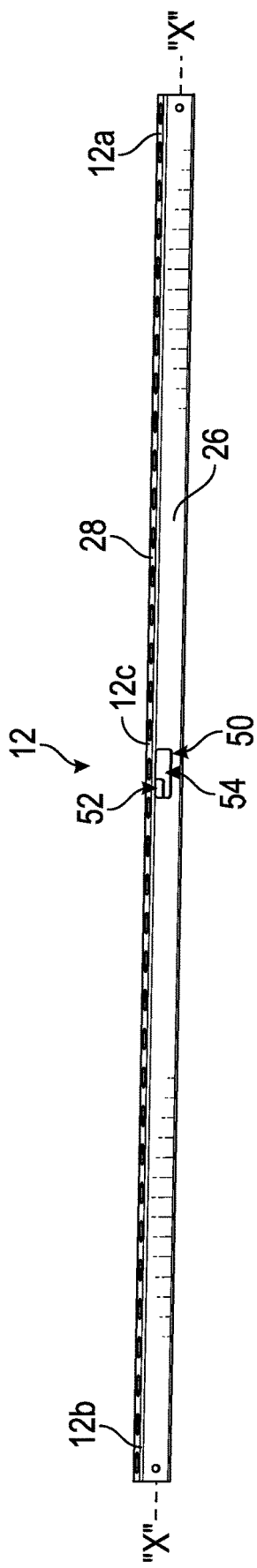
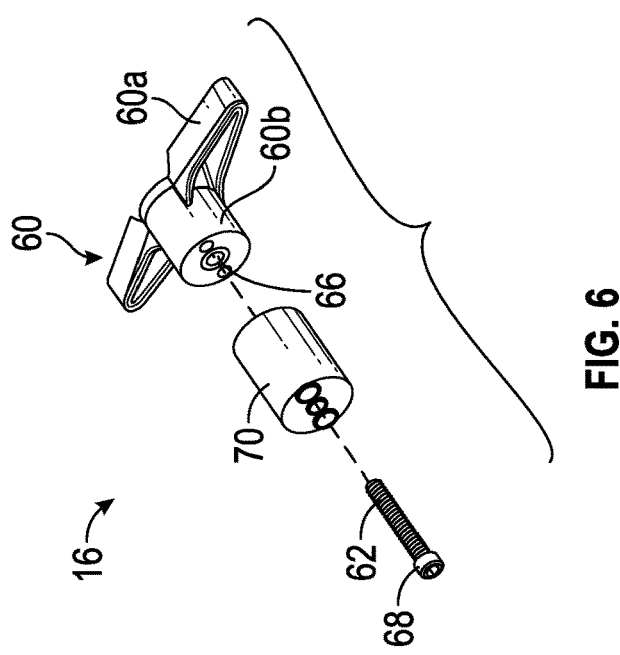
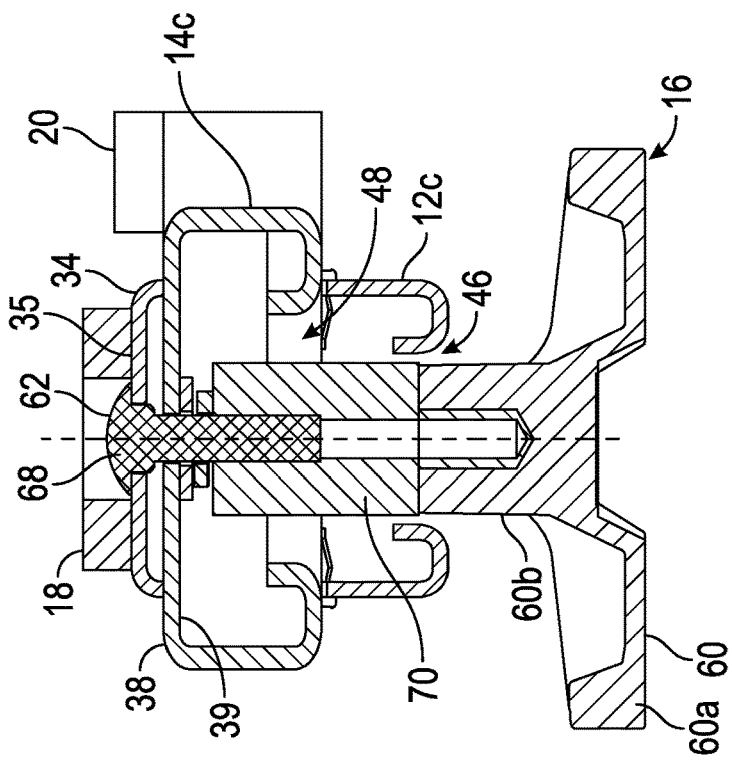
FIG. 4
FIG. 6
FIG. 5

HANGER FOR SUPPORTING AN AIR HANDLER

TECHNICAL FIELD

A support for a heating, ventilating, and air-conditioning ("HVAC") system, and more particularly hangers or supports for suspending an air handler of an HVAC system.

BACKGROUND

An air handler or air handling unit is used to regulate and circulate air as part of an HVAC system. Typically, an air handler is installed inside and works with an outdoor air conditioning and/or heat pump condenser unit to make the air hot or cold. One type of air handler is mounted to a ceiling, for example, to the roof, and suspended within an attic.

There is a continuing need for an improved hanger for suspending an air handler that is cheap and easy to manufacture, assemble, and store, while also being sturdy and capable of evenly distributing the weight of the air handler.

SUMMARY

In one aspect, in accordance with the principles of the present disclosure, a support for an HVAC component is provided and includes first and second elongate struts each having a first end portion, a second end portion, and an intermediate portion disposed between the first and second end portions. The intermediate portion of the first strut defines a channel therethrough. The second strut is configured to be received in the channel of the first strut.

In aspects, the intermediate portion of the second strut may overlap with the intermediate portion of the first strut when the second strut is received in the channel of the first strut.

In aspects, the first and second struts may collectively form an X-shape when the second strut is received in the channel of the first strut.

In aspects, the first end portion of the second strut may extend at an acute angle relative to the first end portion of the first strut and an obtuse angle relative to the second end portion of the first strut when the second strut is received in the channel of the first strut.

In aspects, the first strut may have a first lateral side defining a first opening, and an opposite second lateral side defining a second opening. The channel may extend between the first and second openings.

In aspects, the first and second openings may be offset from one another.

In aspects, the channel may extend at a non-perpendicular angle relative to a longitudinal axis defined by the first strut.

In aspects, the first and second openings may be closed.

In aspects, the first strut may have a square transverse cross-sectional shape and the second strut may have a rectangular transverse cross-sectional shape. The first and second openings may have a rectangular shape.

In aspects, the second strut may be configured to slide within and relative to the channel of the first strut.

In aspects, the support may further include a fastener assembly configured to interconnect the intermediate portions of the first and second struts to one another such that the first and second struts are prohibited from sliding relative to one another.

In aspects, the fastener assembly may include a nut and a screw configured for threaded engagement with the nut.

In aspects, the screw may have a head configured to engage a top side of the first strut. The nut may have a handle portion and a body portion configured to engage an inner-facing surface of a top side of the second strut.

In aspects, the intermediate portion of the first strut may have a bottom side defining an opening through which the body portion of the nut is configured to extend. The intermediate portion of the second strut may have a bottom side defining an opening through which the body portion of the nut is configured to extend.

In aspects, the support may further include an elongated first gasket overlaying a top side of the first strut, and an elongated second gasket overlaying a top side of the second strut.

In aspects, the first strut may define a plurality of apertures spaced from one another along a length of the first strut, and the second strut may define a plurality of apertures spaced from one another along a length of the second strut.

In accordance with another aspect of the present disclosure, a hanger for suspending an air handler is provided and includes an elongated first strut, an elongated second strut, and a fastener assembly. The first strut has a first lateral side defining a first opening, and an opposite second lateral side defining a second opening. The first and second openings are offset from one another. The second strut is configured to extend through the first and second openings of the first strut. The fastener assembly is configured to selectively interconnect the first and second struts to one another to resist the first and second struts sliding relative to one another.

In aspects, the first strut may define a channel extending transversely through the first strut between the first and second openings.

In aspects, the first and second struts may collectively form an X-shape when the fastener assembly interconnects the first and second struts to one another.

As used herein, the terms parallel and perpendicular are understood to include relative configurations that are substantially parallel and substantially perpendicular up to about + or −15 degrees from true parallel and true perpendicular.

BRIEF DESCRIPTION OF THE DRAWINGS

The present disclosure will become more readily apparent from the specific description accompanied by the following drawings, in which:

FIG. 4 is a side, perspective view illustrating a first strut of the support of FIG. 2;

FIG. 5 is a transverse cross-sectional view illustrating a fastener assembly interconnecting the first and second struts of the support of FIG. 1; and FIG. 6 is a perspective view, with parts separated, illustrating the fastener assembly of FIG. 5.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "top" and "bottom" are relative and used only in the context to the other, and are not necessarily "superior" and "inferior".

The present disclosure generally provides a hanger for suspending an air handler from a ceiling or roof. The hanger includes first and second hollow, elongated bars that couple to one another to form an X-shape. Wires or cables may be attached to the opposite ends of each of the bars and fixed to the ceiling or roof. The first bar has a channel that extends through a middle portion thereof. The channel is dimensioned for slidable receipt of the second bar. A fastener or fastener assembly is provided to axially fix the second bar in a selected position within the channel of the first bar. The channel extends at a non-perpendicular angle (e.g., from about 10 degrees to about 80 degrees) relative to a longitudinal axis of the first bar such that upon positioning the second bar in the channel, the first and second bars form the X-shape that is suitable for balancing the air handler thereon. These and other advantageous of the presently disclosed hanger will be further elucidated herein.

Figure 1:
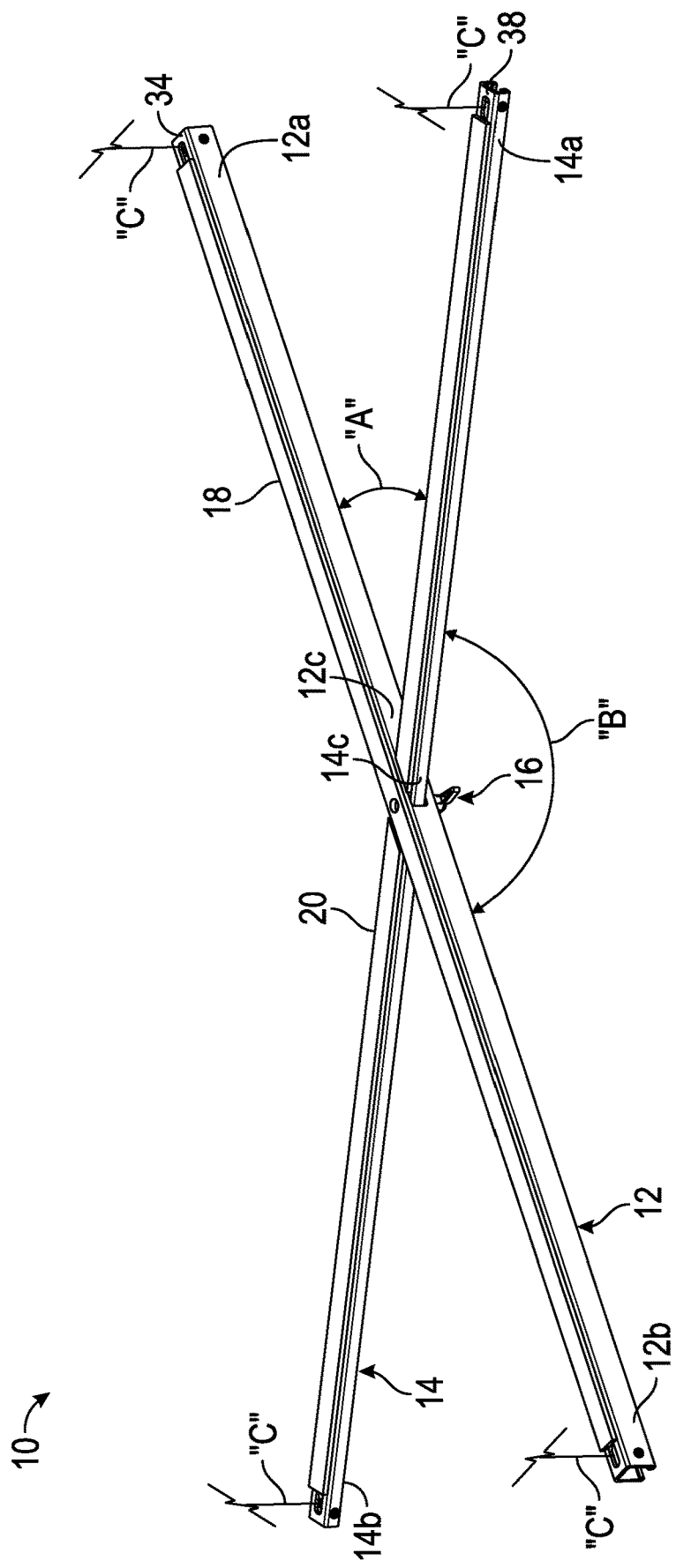
FIG. 1 is a top, perspective view illustrating an exemplary embodiment of a support for an air handler.
Figure 2:
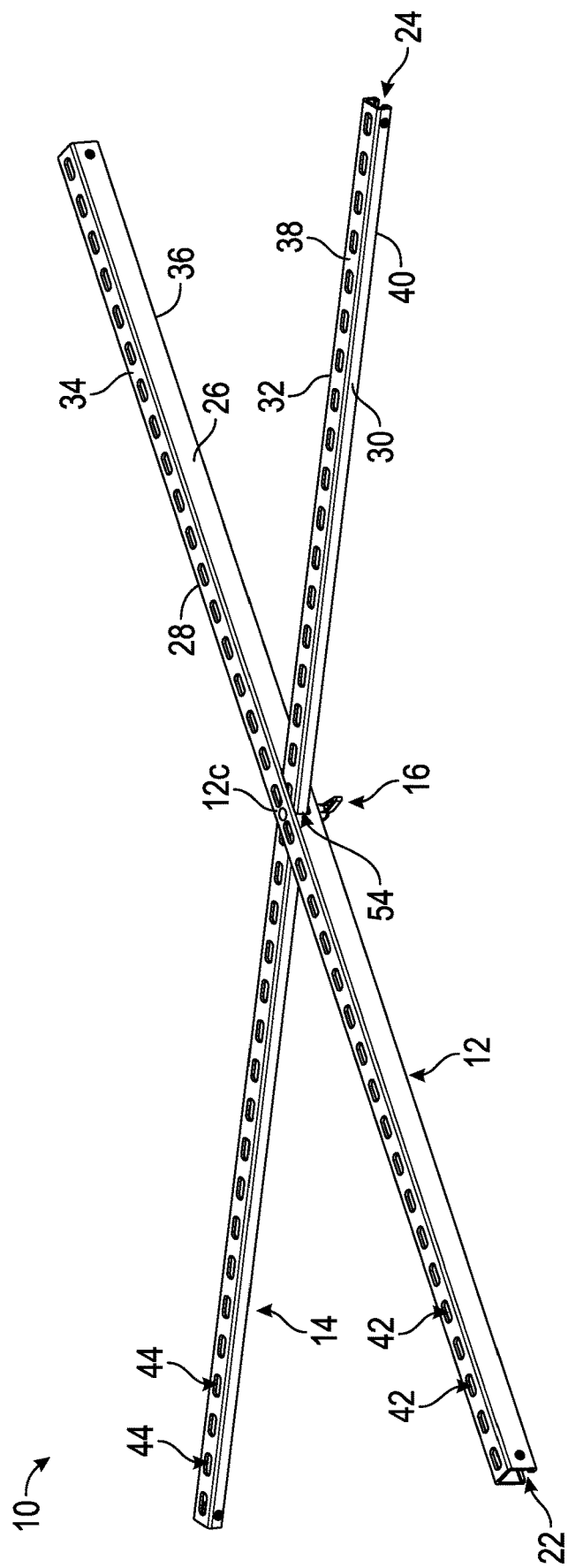
FIG. 2 is a top, perspective view illustrating the support of FIG. 1 with gaskets removed.
Figure 3:
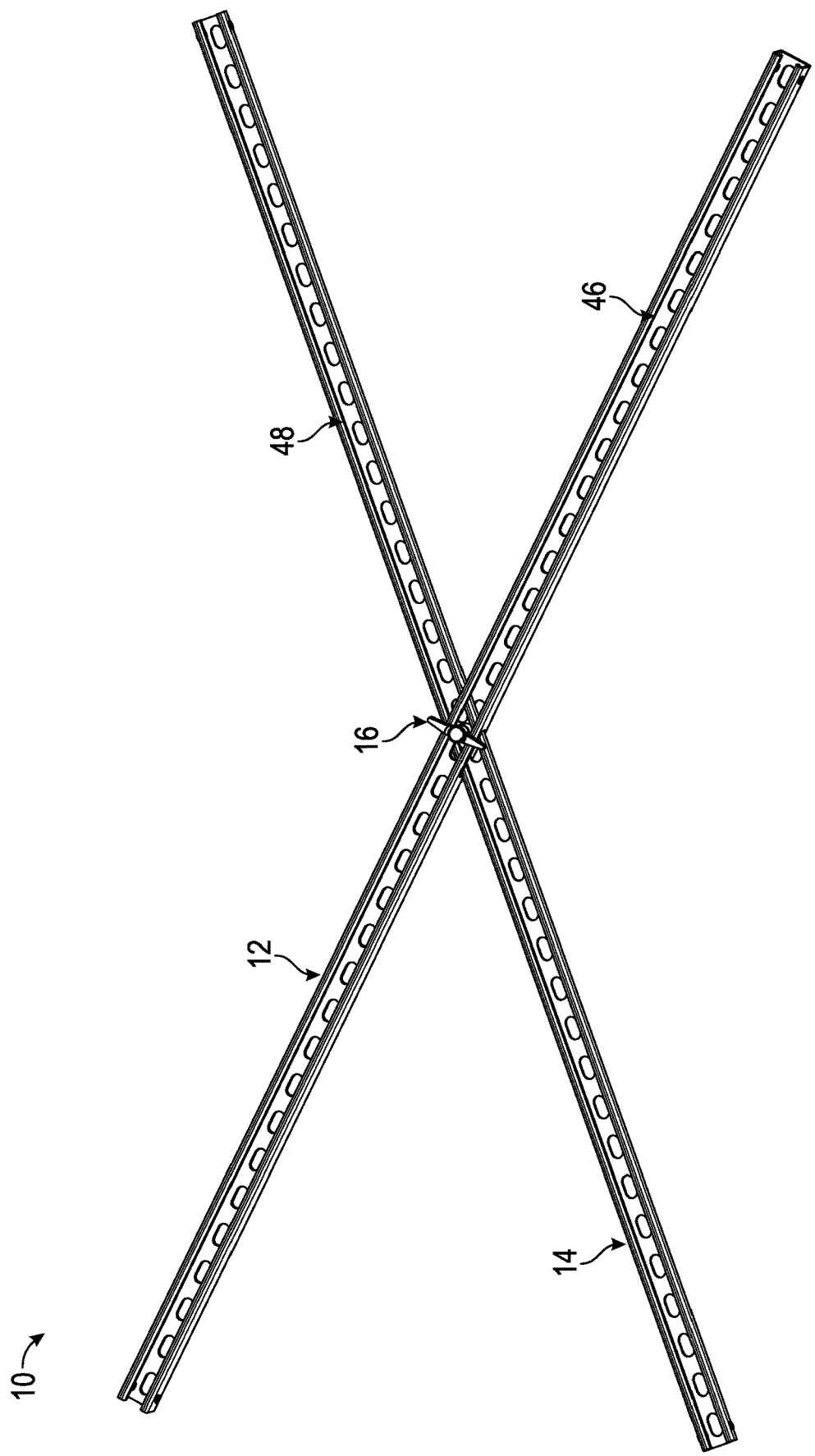
FIG. 3 is a bottom, perspective view illustrating the support of FIG. 2.

With reference to FIGS. 1-3, an exemplary hanger or support 10 for suspending an air handler from a floor is illustrated. In other aspects, the hanger 10 may be configured to support various other components of an HVAC system and/or may support the air handler without suspending the air handler from a floor. The hanger 10 generally includes an elongated first strut or bar 12, an elongated second strut or bar 14, and a fastener assembly 16 configured to selectively fix the second strut 14 to the first strut 12. The first and second struts 12, 14 may be fabricated from a metal, such as, for example, aluminum or steel, or any other suitable material configured to resist bending. The first strut 12 has a square transverse cross-sectional shape whereas the second strut 14 has a rectangular transverse cross-sectional shape. It is contemplated that the first and second struts 12, 14 may have other transverse cross-sectional shapes, such as triangular, planar, oval, or the like.

Each of the first and second struts 12, 14 has a first end portion 12a, 14a, a second end portion 12b, 14b, and an intermediate portion 12c, 14c disposed between the first and second end portions 12a, 12b, 14a, 14b, respectively. Each of the end portions 12a, 12b, 14a, 14b of the first and second struts 12, 14 may have a wire or cable "C" attached thereto at a first end of the cable "C." The cables "C" may be fixed to the struts 12, 14 by being tied, using a fastener, or any other suitable fastening engagement. The cables "C" may be attached to a ceiling or other structure hanging from the ceiling to suspend the hanger 10 from the ceiling.

With reference to FIG. 1, the hanger 10 may include a first elongated gasket 18 disposed on a top side 34 of the first strut 12, and a second elongated gasket 20 disposed on a top side 38 of the second strut 14 to enhance frictional engagement with an air handler (not shown) supported thereon. The first and second gaskets 18, 20 may be attached to the first and second struts 12, 14 using an adhesive, a fastener, or the like. It is contemplated that the first and second gaskets 18, 20 may be rubber, foam, or any other material suitable to enhance the frictional engagement between the air handler and the hanger 10. The second gasket 20 may include a pair of discrete gaskets that are separated from one another to leave the intermediate portion 14c of the second strut 14 uncovered.

With reference to FIGS. 2-4, each of the first and second struts 12, 14 defines a longitudinally-extending passageway 22, 24 therethrough and has opposing first and second lateral sides 26, 28 and 30, 32 and opposing top and bottom sides 34, 36 and 38, 40. The top side 34, 38 of each of the first and second struts 12, 14 defines a plurality of apertures 42, 44 spaced apart from one another along the length of the first and second struts 12, 14. The apertures 42, 44 may be used as fixation points for attaching various items to the first and second struts 12, 14 such as the fastener assembly 16, as will be described. The bottom side 36, 40 of the first and second struts 12, 14 defines an opening 46, 48 (FIGS. 3 and 5) in communication with the passageway 22, 24. It is contemplated that the passageways 22, 24 and openings 46, 48 make for a lighter hanger 10 without compromising the integrity of the hanger 10.

The first lateral side 26 of the first strut 12 defines a first opening 50 therethrough at the intermediate portion 12c of the first strut 12, and the second lateral side 28 of the first strut 12 defines a second opening 52 therethrough at the intermediate portion 12c of the first strut 12. As such, the intermediate portion 12c of the first strut 12 defines a channel 54 that extends between the first and second openings 50, 52 configured for slidable receipt of the second strut 14. The first and second openings 50, 52 are closed and may have a rectangular shape corresponding to the rectangular shape of the second strut 14. The first and second openings 50, 52 are offset from one another such that the channel 54 extends at a non-perpendicular angle relative to a longitudinal axis "X" of the first strut 12. For example, the first opening 50 is disposed at a first location along the longitudinal axis "X" of the first strut 12 and the second opening 52 is disposed at a second location along the longitudinal axis "X" of the first strut 12. In this way, when the second strut 14 is received in the channel 54 of the first strut 12, the first and second struts 12, 14 collectively form an X-shape. For example, as shown in FIG. 1, the first end portion 14a of the second strut 14 extends at an acute angle "A" (e.g., from about 10 degrees to about 80 degrees, and in some aspects about 50 degrees) relative to the first end portion 12a of the first strut 12, and at an obtuse angle "B" (e.g., from about 100 degrees to about 170 degrees, and in some aspects about 130 degrees) relative to the second end portion 12b of the first strut 12. The X-shape of the hanger 10 makes the hanger 10 effective at evenly distributing the weight of the air handler without tilting or flipping.

With reference to FIGS. 3, 5, and 6, the fastener assembly 16 of the hanger 10 is configured to interconnect the intermediate portions 12c, 14c of the first and second struts 12, 14 to one another such that the first and second struts 12, 14 are prohibited from sliding relative to one another. The fastener assembly 16 includes a nut 60 and a threaded cap screw 62 configured for threaded engagement with the nut 60. In aspects, instead of using a screw 62, a non-threaded bolt may be provided that is attached to the nut 60 via a friction-fit engagement. The nut 60 includes a handle portion 60a and a body portion 60b extending perpendicularly from a center of the handle portion 60a. The handle portion 60a may have a pair of wings configured to be grasped by a user to facilitate rotation of the nut 60 relative to the screw 62. The body portion 60b may be cylindrical and defines an internal thread 66 configured for threaded engagement with the screw 62. The screw 62 may have a head 68 (e.g., a hexagonal socket) configured to engage a top surface 35 of the top side 34 of the first strut 12 whereas the body portion 60b of the nut 60 is configured to engage an inner-facing surface 39 of the top side 38 of the second strut 14. In aspects, the fastener assembly 16 may include a cylindrical spacer 70 detachably secured to the nut 60 via a pair of screws (not shown). In aspects, the spacer 70 may be formed with the body portion 60b of the nut 60.

To assemble the hanger 10, the second strut 14 may be guided into the first opening 50 (FIG. 4) in the first strut 12, through the channel 54 of the first strut 12, and out of the second opening 52 in the first strut 12. The second strut 14 may be slid relative to the first strut 12 until the intermediate portions 12c, 14c of the first and second struts 12, 14 overlap one another. It is contemplated that the second strut 14 may be set at any suitable position relative to the first strut 12. With the first and second struts 12, 14 set at a suitable position relative to one another, the fastener assembly 16 is used to fix the first and second struts 12, 14 relative to one another to resist the second strut 14 from sliding within the channel 54 of the first strut 12.

In particular, the body portion 60b (FIG. 5) of the nut 60 is guided through the opening 46 in the bottom side 36 of the first strut 12 and then through the opening 48 in the bottom side 40 of the second strut 14 and into engagement with the inner-facing surface 39 (FIG. 5) of the top side 38 of the second strut 14. The screw 62 of the fastener assembly 16 is also passed through one of the apertures 42 in the top side 38 of the first strut 12 and engaged with the nut 60. With the nut 60 and screw 62 engaged to one another, the handle portion 60a of the nut 60 may be rotated to threadedly engage the nut 60 and screw 62 to one another and thereby secure the first and second struts 12, 14 to one another. The first and second gaskets 18, 20 (FIGS. 1 and 5) may then be applied to the top sides 34, 38 of the first and second struts 12, 14. With the hanger 10 assembled, the hanger 10 may be suspended from a ceiling utilizing, for example, the cables "C," and an air handler may be positioned on the hanger 10.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A support for a component of an HVAC system, the support comprising:
    an elongated first strut having a first end portion, a second end portion, and an intermediate portion disposed between the first and second end portions, the intermediate portion defining a channel therethrough, the first strut having a first lateral side defining a first opening, and an opposite second lateral side defining a second opening, the channel extending between the first and second openings; and
    an elongated second strut having a first end portion, a second end portion, and an intermediate portion disposed between the first and second end portions of the second strut, wherein the second strut is configured to be received in the channel of the first strut, and the first and second openings are closed.

2. The support according to claim 1, wherein the intermediate portion of the second strut overlaps with the intermediate portion of the first strut when the second strut is received in the channel of the first strut.

3. The support according to claim 1, wherein the first and second struts collectively form an X-shape when the second strut is received in the channel of the first strut.

4. The support according to claim 1, wherein the first end portion of the second strut extends at an acute angle relative to the first end portion of the first strut and an obtuse angle relative to the second end portion of the first strut when the second strut is received in the channel of the first strut.

5. The support according to claim 1, wherein the first and second openings are offset from one another.

6. The support according to claim 5, wherein the channel extends at a non-perpendicular angle relative to a longitudinal axis defined by the first strut.

7. The support according to claim 1, wherein the first strut has a square transverse cross-sectional shape and the second strut has a rectangular transverse cross-sectional shape, and the first and second openings have a rectangular shape.

8. The support according to claim 1, wherein the second strut is configured to slide within and relative to the channel of the first strut.

9. The support according to claim 1, further comprising a fastener assembly configured to interconnect the intermediate portions of the first and second struts to one another such that the first and second struts are prohibited from sliding relative to one another.

10. The support according to claim 9, wherein the fastener assembly includes:
    a nut; and
    a screw configured for threaded engagement with the nut.

11. The support according to claim 10, wherein the screw has a head configured to engage a top side of the first strut, and the nut has a handle portion, and a body portion configured to engage an inner-facing surface of a top side of the second strut.

12. The support according to claim 11, wherein the intermediate portion of the first strut has a bottom side defining an opening through which the body portion of the nut is configured to extend, and the intermediate portion of the second strut has a bottom side defining an opening through which the body portion of the nut is configured to extend.

13. The support according to claim 1, further comprising:
    an elongated first gasket overlaying a top side of the first strut; and
    an elongated second gasket overlaying a top side of the second strut.

14. The support according to claim 1, wherein the first strut defines a plurality of apertures spaced from one another along a length of the first strut, and the second strut defines a plurality of apertures spaced from one another along a length of the second strut.

15. A hanger for suspending an air handler, the hanger comprising:
    an elongated first strut having a first lateral side defining a first opening, and an opposite second lateral side defining a second opening, wherein the first and second openings are offset from one another;

an elongated second strut configured to extend through the first and second openings of the first strut;

a fastener assembly configured to selectively interconnect the first and second struts to one another to resist the first and second struts sliding relative to one another; and four cables configured to attach to respective opposite first and second end portions of the first and second struts, wherein the four cables are configured to suspend the hanger from a ceiling.

16. The hanger according to claim 15, wherein the first strut defines a channel extending transversely through the first strut between the first and second openings.

17. The hanger according to claim 15, wherein the first and second openings are closed.

18. The hanger according to claim 15, wherein the first and second struts collectively form an X-shape when the fastener assembly interconnects the first and second struts to one another.

19. A support for a component of an HVAC system, the support comprising:

an elongated first strut having a first end portion, a second end portion, and an intermediate portion disposed between the first and second end portions, the intermediate portion defining a channel therethrough; and an elongated second strut having a first end portion, a second end portion, and an intermediate portion disposed between the first and second end portions of the second strut, the second strut being configured to be received in the channel of the first strut, wherein the first strut defines a plurality of apertures spaced from one another along a length of the first strut, and the second strut defines a plurality of apertures spaced from one another along a length of the second strut.

20. A support for a component of an HVAC system, the support comprising:

an elongated first strut having a first end portion, a second end portion, and an intermediate portion disposed between the first and second end portions, the intermediate portion defining a channel therethrough;

an elongated second strut having a first end portion, a second end portion, and an intermediate portion disposed between the first and second end portions of the second strut, wherein the second strut is configured to be received in the channel of the first strut; and a fastener assembly configured to interconnect the intermediate portions of the first and second struts to one another such that the first and second struts are prohibited from sliding relative to one another, the fastener assembly including:

a nut having a handle portion, and a body portion configured to engage an inner-facing surface of a top side of the second strut; and a screw configured for threaded engagement with the nut, the screw having a head configured to engage a top side of the first strut.

* * * * *